United States Patent [19]

Douglas

[11] 4,086,604
[45] Apr. 25, 1978

[54] SELECTIVE CLOSURE OF CAMERA VIEWFINDER AND CAMERA INCORPORATING SAME

[75] Inventor: Lawrence M. Douglas, South Easton, Mass.

[73] Assignee: Polaroid Corporation, Cambridge, Mass.

[21] Appl. No.: 720,047

[22] Filed: Sep. 2, 1976

[51] Int. Cl.² ............................................. G03B 13/02
[52] U.S. Cl. ..................................... 354/219; 354/86; 354/246
[58] Field of Search ..................... 354/219, 246, 83–86

[56] References Cited
U.S. PATENT DOCUMENTS

3,537,370 11/1970 Wareham ................................ 354/86
3,821,768 6/1974 Urano et al. ........................... 354/219

*Primary Examiner*—John Gonzales
*Attorney, Agent, or Firm*—David R. Thornton

[57] ABSTRACT

A camera of the self-developing type closes the viewfinder during the advance of an exposed but unprocessed film unit across the viewfinder path. A blade coupled with the shutter closes the viewfinder path upon opening of the shutter. Subsequent passage of an exposed film unit across the viewfinder path, which delivers the film unit to processing elements which initiate fixing of the photographic image, releases the blade for return to the open position. The shutter cocking movement provides the motion for opening the viewfinder capping blade.

10 Claims, 10 Drawing Figures

SELECTIVE CLOSURE OF CAMERA VIEWFINDER AND CAMERA INCORPORATING SAME

BACKGROUND OF THE INVENTION

This invention relates to shutter structure which selectively closes the viewfinder path of photographic apparatus. More particularly, the invention provides camera shutter structure for closing the viewfinder path to prevent further exposure of an exposed but unprocessed film unit of the self-developing type.

Most camera designs, other than those of the single lens reflex type, do not require that the viewfinder path be closed at any time. In most cameras, the viewfinder path is separate from the optical image path and separate from the path of the film. This separation of the viewfinder path from the image path and from the film path is generally easy to attain in a camera employing small format film, while still locating the viewfinder window close to the taking lens as desired for accurate framing. In a single lens reflex camera, where the viewfinder path goes through the taking lens, structures are known for closing the viewfinder during the brief time the shutter is open. These structures prevent light from entering the viewfinder and passing through the open shutter to the film.

Further, cameras of the self-developing type conventionally locate the spread rollers, which initiate processing of an exposed film unit to fix a visible image, directly adjacent the image surface, which is the site at which the film is exposed. The film, accordingly, is advanced directly from the image surface to the spread rollers without subjecting it to further optical paths, either of the image or of the viewfinder. Hence, even though the film in a selfdeveloping camera is relatively large to provide a readily viewable image, there has heretofore been little need to close the viewfinder path in these cameras.

It is, however, known in the art —as U.S. Pat. Nos. 3,460,452 of E. H. Land and 3,537,370 of R. R. Wareham disclose— to close both the image path and the viewfinder of a scanning-type self-developing camera. In the camera which these patents disclose, as a film unit moves under a scanning type exposure aperture, a leading portion of it crosses the viewfinder path. The film unit, however, picks up a flexible shade which shields it from unwanted exposure by light in the viewfinder. After scanned exposure of the entire film unit, the movement of the film unit is reversed and it is drawn back under the scanning aperture to be fed through the spread rollers. To avoid exposure during this second pass under the scanning aperture, a capping blade is interposed across the image path during the reverse film movement. Thus, in these cameras the opaque shade shields the exposed but unprocessed film during passage both forward and backward across the viewfinder path, and the capping blade shields it from the image aperture during the reverse movement.

The two film-shielding structures, i.e., the shade and the capping blade, are located separately in the camera and operate essentially independently of one another. Also, it is noteworthy that this prior scanning-type camera has the spread rollers close to the film package, and moves the film back and forth as described above by selective engagement with the rollers. Further, the camera has no shutter of the conventional type, i.e., which opens and closes to expose a stationary film unit.

Accordingly, it is an object of this invention to provide a selective viewfinder closure for a photographic camera and which operates automatically with the camera shutter. The term "viewfinder" is used herein in a broad sense to include a photographic range finder and even certain forms of photometer or other "electric eye" exposure-control sensors.

Another object of the invention is to provide a camera viewfinder closure for shielding unprocessed film and which operates with a single direction of film advance. A further object is that the viewfinder closure opens only after passage of the unidirectionally-advancing film.

A more specific object is to provide a camera viewfinder closure which closes without requiring engagement with the film. It is also an object, however, that the closure sense the film passage to control the reopening of the viewfinder path.

Another object of the invention is to provide an improved photographic shutter which operates with electronic exposure control and which includes a viewfinder closure.

A further object of the invention is to provide shutter and viewfinder closure apparatus of the above character which is relatively easy to incorporate in a camera, is of relatively low cost manufacture, and operates reliably.

Other objects of the invention will in part be obvious and will in part appear hereinafter.

GENERAL DESCRIPTION OF THE INVENTION

A photographic camera embodying the invention has a capping member normally disposed so that the camera viewfinder path is open for normal viewing and framing, but movable optically to block the path. In a preferred embodiment, the capping member is like a shutter blade and moves from a normal position where it is outside the viewfinder path to a further position where it is interposed across the path.

The capping member is coupled with the camera shutter to maintain the viewfinder open until the instant that the shutter closes. The capping member then automatically closes the viewfinder. A releasable latch holds the capping member in the closed position to prevent inadvertent opening of the viewfinder. When the viewfinder is again ready to be opened, the recocking movement of the shutter provides the motion to shift the capping member to the normal, open position. However, the latch holds the capping member closed over the viewfinder until a film unit has advanced fully out of the viewfinder path.

A camera of the self-developing type advantageously employs the capping member to close the viewfinder path and thereby allow an exposed film unit to advance across the viewfinder without further exposure and hence prior to processing. This freedom to advance an exposed film unit across the camera viewfinder without exposure, in the manner which the invention provides, allows the spread rollers of the camera to be located far removed from the site where the film unit is exposed. More particularly, it allows the camera to be designed with the optical elements arranged and packaged with less constraint due to requirements for the location of the spread rollers and elements attendant with them. For example, such a camera can have the optical elements arranged in a new configuration of optimal compactness and performance, and have the spread rollers removed to a relatively distal location, e.g. adjacent the periphery of the camera housing.

The invention accordingly comprises the features of construction, combinations of elements, and arrangement of parts exemplified in the constructions hereinafter set forth, and the scope of the invention is indicated in the claims.

BRIEF DESCRIPTION OF THE DRAWINGS

For a fuller understanding of the nature and the objects of the invention, reference should be had to the following detailed description, taken in connection with the accompanying drawings, in which.

DESCRIPTION OF ILLUSTRATED EMBODIMENTS

Figure 1:
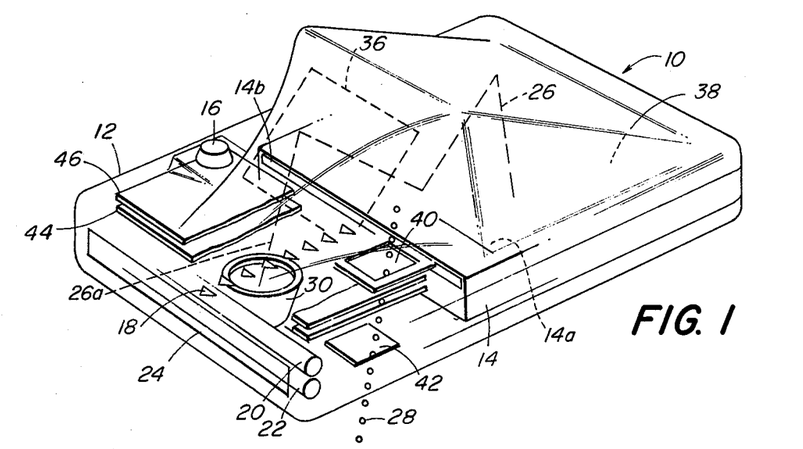
FIG. 1 is a simplified perspective view, partly broken away, of a self-developing camera incorporating a shutter and viewfinder closure according to the invention.

A self-developing camera 10 embodying the invention has, as FIG. 1 shows, a housing 12 which forms a compartment for receiving a cassette 14 of stacked, self-developing film units. After exposure through a window 14a in the top of the cassette, as initiated by depressing the camera shutter release button 16, the top film unit is advanced out of the cassette through a cassette exit slot 14b, and along a film advance path 18. Advancing the exposed film unit along the path 18 transports it to the nip between a pair of spread rollers 20, 22. These rollers discharge a photoprocessing composition, carried with the film unit in a rupturable pod, and spread it across the photosensitive layers of the film unit to initiate the photoprocessing that develops the latent image on the film unit. After engagement with the spread rollers, the film unit is discharged from the camera through an optically-shaded passage 24.

A further description of the camera 10, aside from the shutter and viewfinder capping mechanism described hereinafter, is set forth in the following commonly-assigned patent applications filed on even date herewith and which are incorporated herein by reference: " Compact Self-Developing Camera With Folded Optical Image Path" by L. M. Douglas, Ser. No. 720,054; "Camera With Movable Film Drive and Optical Unit" by L. M. Douglas, Ser. No. 720,006; "Film Advance Mechanism" by L. M. Douglas, Ser. No. 720,007; and "Compact Prism Camera" by B. K. Johnson, Ser. No. 720,004. Further, a film cassette with which the illustrated camera 10 can be used is described in U.S. Pat. No. 3,651,746 of E. H. Land entitled "Film Assemblage " and is commercially available from Polaroid Corporation for use in cameras bearing the registered designations "SX-70" and "PRONTO!" The separate, card-like film units in the cassette which are advanced out of the cassette singly and one at a time, are described in U.S. Pat. No. 3,415,644 of E. H. Land for "Novel Photographic Products and Processes".

With further reference to FIG. 1, the film units typically are flat when stacked in the cassette 14, and the foremost one is located at the image surface of the camera. The illustrated camera provides a straight film advance path 18 which lies essentially in the plane of this image surface. The optical image path 26 of the camera extends from the camera taking lens 30, which the housing supports below the plane of the image surface, to successive optically aligned reflective surfaces that fold the path. The last reflection directs the light path to expose a film unit at the image surface. Typically, the first reflective surface is provided by a mirror 36, and the other surfaces are faces of a prism 38.

The viewfinder of the camera 10 has two optical elements 40 and 42 aligned along a viewfinder path 28 and mounted in the camera housing 12. As desired for precise framing, the viewfinder path 28 is aligned with the passage of the image path 26 through the taking lens 30 and is only slightly offset to the side from the lens. To minimize the physical size of the camera and to attain this desired proximity of the viewfinder path with the axis of the taking lens, the viewfinder elements are not offset to the side from a film unit advancing along the path 18, but rather are located to project the path 28 within the swath of an advancing film unit.

With this construction of the camera 10, an exposed film unit advancing along the path 18 from the cassette 14 to the spread rollers crosses the optical image path 26 and crosses the optical viewfinder path 28. The film unit in particular crosses the image path section 26a which extends between the lens 30 and the mirror 36. Accordingly, unless optically blocked, light which enters the camera through the taking lens 30 and is present in this section of the image path will further expose the unprocessed film unit. This further exposure will, of course, damage the latent image which the film unit bears from exposure at the image surface. Similarly, the advancing film unit is subject to unwanted exposure by light in the viewfinder.

A commercially-available film unit with which the camera 10 can be used is typically a laminated structure with a photosensitive side, illustrated as the top side in FIG. 1.

The camera 10 shields this photosensitive side of the film unit from unwanted light with the shutter and with a viewfinder capping mechanism, which will now be described with further reference to the drawings. An opaque sheet in the film unit behind the photosensitive layer protects it from light incident from the other side, e.g. from the bottom side in the orientation in FIG. 1.

FIG. 1 further shows that the film advance path 18 is sandwiched between two elements 44 and 46 which have opposed flat surfaces relatively closely spaced apart above and below the path 18. These surfaces guide the film during passage from the cassette 14 to the spread rollers. The lower element 44 is apertured along the image path section 26a and along the viewfinder path 28. The upper element 46, however, includes the shutter and the viewfinder capping mechanism, elements of which are shown in the simplified exploded view of FIG. 2 and in the assembled view of FIG. 3.

With reference to these views and to FIG. 1, the mechanism 46, which the camera housing 12 mounts above the film path 18 and interposed across the image path section 26a and across the viewfinder path 28, has a housing-mounted support plate 48 on which shutter blades 50 and 52, and a viewfinder capping blade 54, slide. The lower surface of the support plate 48 is smooth to provide the uppermost of the above-noted film guide surfaces. The plate 48 is apertured with an image opening 48a and a viewfinder opening 48b, the former aligned over the taking lens 30 and the latter aligned between the viewfinder elements 40 and 42. The width of the plate, measured right to left in FIG. 2, spans across the entire width of a film unit passing thereunder, and the length of the plate spans a major portion of the film path length between the cassette 14 and the camera spread rollers 20, 22. As shown, the image opening and the viewfinder opening are aligned and spaced apart along the width of the plate.

Mounted on the plate 48 along its forward edge 48c (i.e., along the edge close to the camera spread rollers) are blocks 60 and 62 that carry a pair of parallel guide rods 64, 66. The illustrated rods span essentially the entire width of the support plate. The plate also mounts an escapement-like latch 68 for rotation about an axis transverse to the plate and passing through the mounting fastener 70. The latch has two opposed and facing latch fingers 68a and 68b which lie above the plate 48, and it has a camming shelf 68c which protrudes below the plate 48 beyond the edge thereof adjacent the viewfinder opening 48b. The two latch fingers constrict the passage out of a latching recess 68d, and the inner or latching edge of the front finger 68b is offset further into this recess than the corresponding inner edge of the back finger 68a. The front finger 68b has a latch-camming surface adjoining the foregoing latching edge; a member engaging this camming surface rotates the latch counterclockwise, as viewed in FIG. 2. However, a wire spring 72, mounted on the fastener 70 and compressively engaged between the block 62 and the latch 68, biases the latch clockwise. A stop 74 mounted on the plate 48 limits clockwise rotation of the latch to a normal position shown in FIG. 2.

Figure 2:
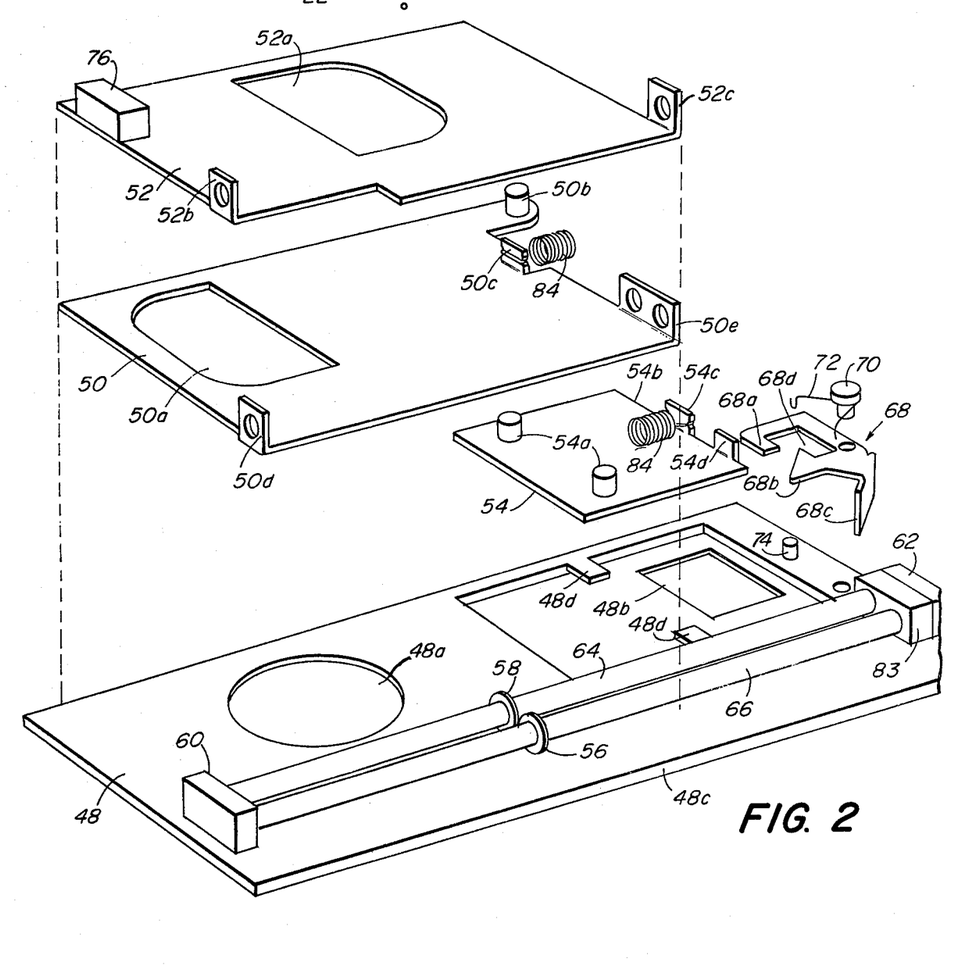
FIG. 2 is an exploded view of the shutter and viewfinder capping blades of the camera of FIG. 1.
Figure 3:
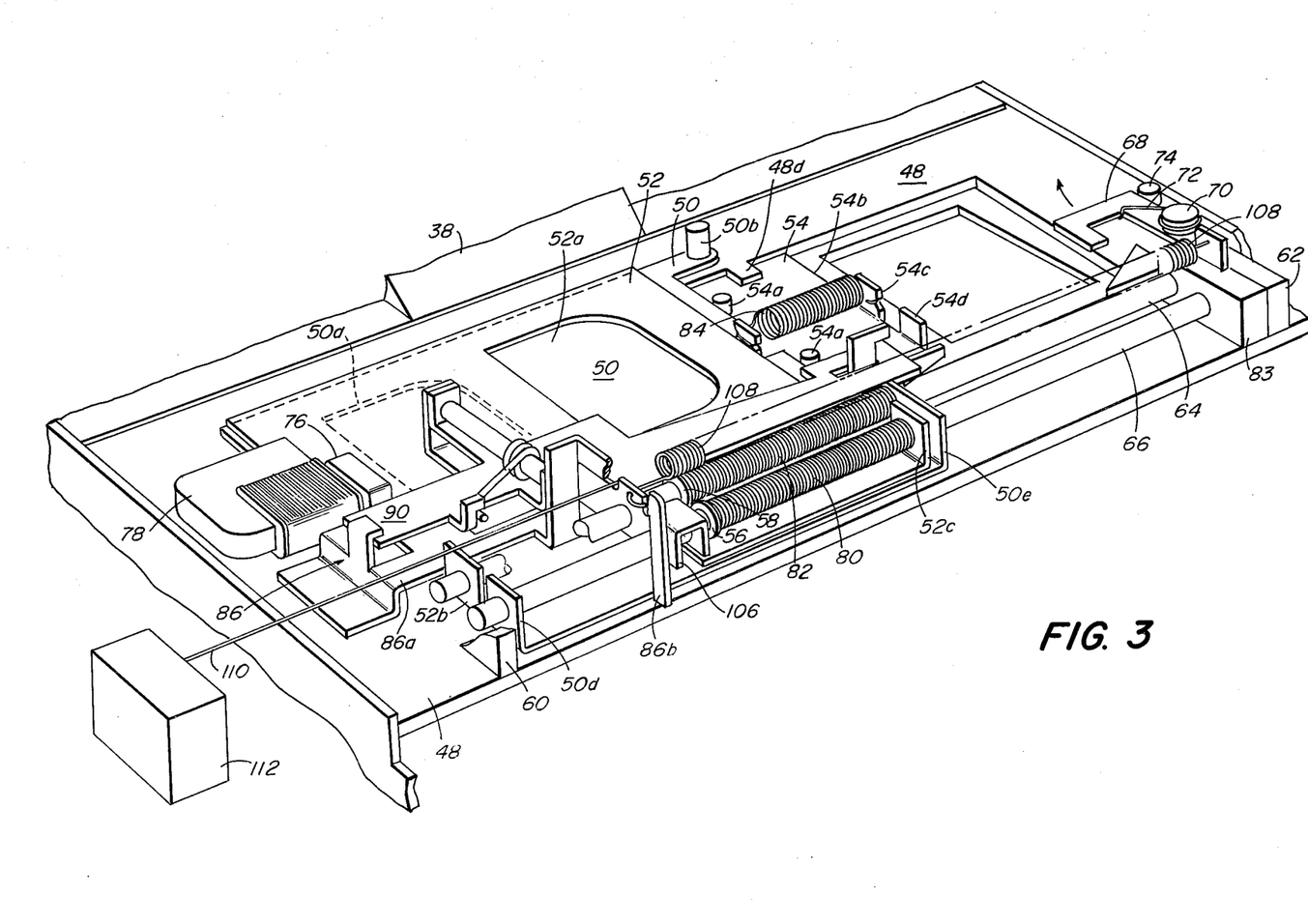
FIG. 3 is a perspective view of the assembled shutter and viewfinder closure of FIGS. 1 and 2.

With further reference to FIGS. 2 and 3, which show the camera shutter in the cocked position and the viewfinder open, the shutter blades 50 and 52 and the capping blade 54 typically are of metal sheet stock. The shutter-opening blade 50 has an opaque central portion which normally overlies and hence blocks the support plate opening 48a. To the left the blade has an aperture-opening window 50a, one edge of which is straight and which progressively moves across the opening 48a when the blade moves to open the shutter, i.e., moves to the right. Adjacent the blade edge on the other side of the opaque central portion, the opening blade 50 carries an upstanding switch-actuator 50b, a spring-mounting tab 50c also projects upward on the blade adjacent this edge. Along the forward width-spanning side of the blade 50, i.e., the side which is forward in the camera 10, the blade has two upstanding and spaced-apart guide tabs 50d and 50e. The guide tab 50d is apertured to slidingly seat on the rod 66 and the tab 50e is doubly apertured to slidingly seat on both rods 64 and 66.

Slidingly disposed over the opening blade 50 is the aperture-closing blade 52. It has a centrally-located aperture-closing window 52a formed with a straight trailing edge which progressively moves across the opening 48a when the blade moves to its shutter closing position, i.e., to the right in FIG. 2. Along one edge of the forward side, the blade 52 has an upstanding tab 52b that slidingly seats on the rod 64. At the opposite forward edge, there is an upstanding tab 52c which slidingly seats on the rod 66. The blade also carries a bar 76 of ferromagnetic material located adjacent an edge for magnetically coupling with, and thereby retain the blade stationary, a shutter-controlling electromagnet 78, FIG. 3.

As FIG. 3 shows, the assembled shutter mechanism has a coil spring 80 seated on the guide rod 66 and compressed between a stop collar 56 fixed thereon and the tab 52c of the closing blade. Similarly, a coil spring 82 is seated on rod 64 compressed between a stop collar 58 fixed thereon and the tab 50e of the aperture-opening blade. In the cocked position shown, the shutter blades 50, 52 are in their extreme leftmost positions, with their tabs 50d and 52b closely adjacent the mounting block 60 and the other tabs 50e and 52c spaced far from the other block 62. The springs 80 and 82 accordingly are compressed. When the blades are released from the cocked position of FIG. 3 in a manner to be described, the springs 80, 82 slidingly drive first the aperture-opening blade 50 to the right and then the aperture-closing blade 52. The blade 50 moves in this manner from the position shown in FIG. 3 until the tab 50e impacts against an energy-absorbing cushion 83 seatingly mounted against the mounting block 62. The blade 52 travels until its tab 52c abuts the tab 50e.

With continued reference to FIGS. 2 and 3, the viewfinder capping blade 54 is illustrated as nested under the opening blade 50 in a slide recess in the mounting plate 48 and under retaining tabs 48d, 48d. The capping blade mounts two upstanding stops 54a, 54a which abut the edge of blade 50 to limit movement of the capping blade leftward relative to the opening blade. Adjacent the blade edge 54b which faces the direction of capping movement (i.e., rightward), the blade has an upstanding tab 54c that mounts one end of a coil tension spring 84, the other end of which is secured to the tab 50c of the opening blade. There is also an upstanding bar 54d located to cammingly engage the latch finger 68b and enter the latching recess 68d upon movement of the blade 54 to the viewfinder capping position, from the uncapping position shown.

Figure 4:
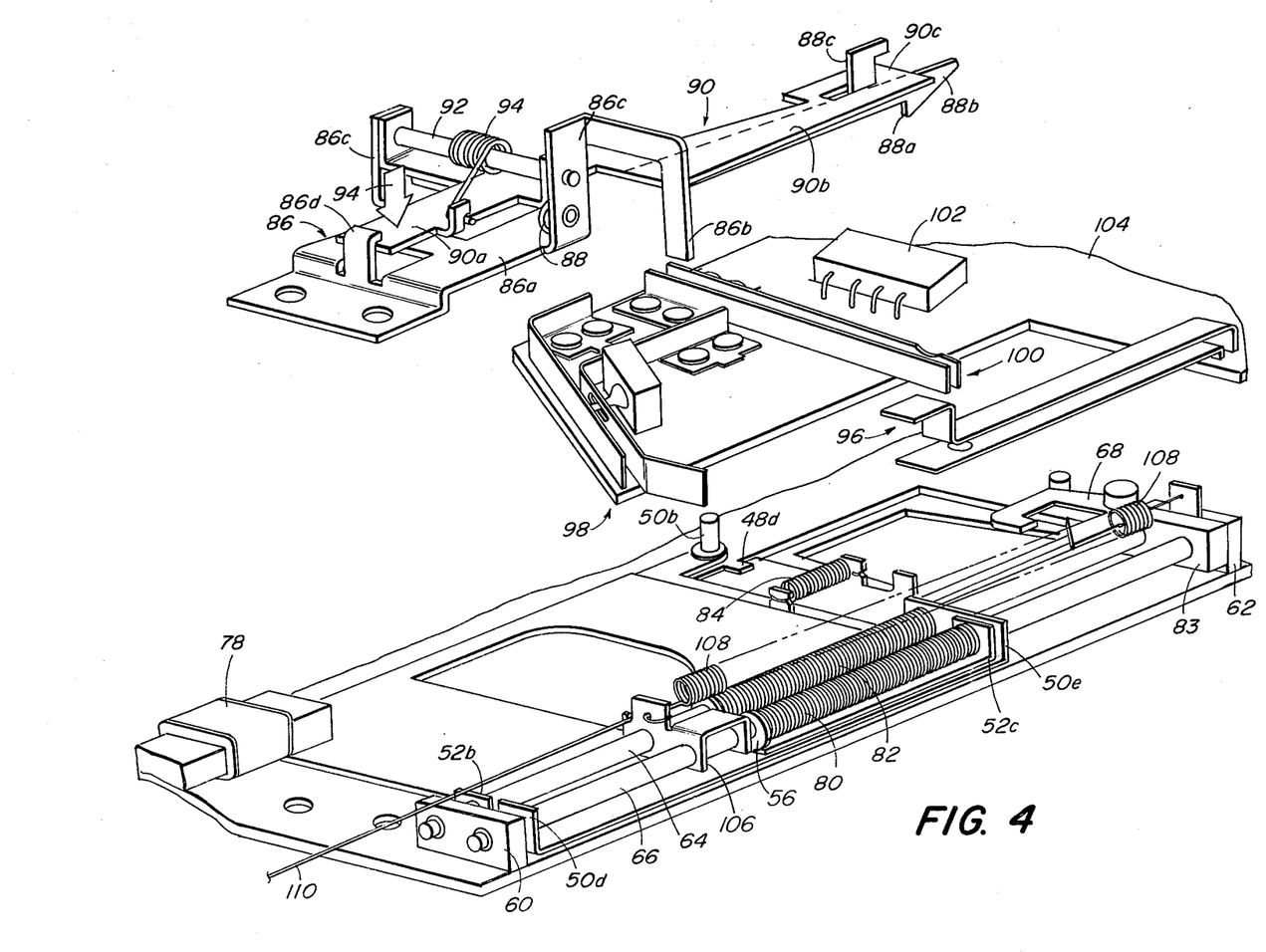
FIG. 4 is a further exploded view showing the shutter and the viewfinder capping construction.

FIGS. 3 and 4 show that a retaining bracket 86 mounts on the support plate 48 to contain the shutter blades relative to the plate. The bracket has a panel portion 86a fixedly spaced above the plate 48 to bridge over the stacked shutter blades and thereby, together with the mountings of the blades on the slide rods, hold the blades essentially flat over the support plate in a manner that imposes little frictional drag on the sliding movement of the plates along the rods 64, 66. The panel portion of the bracket extends from the mounting of the bracket to the plate 48 to a foot portion 86b of the bracket which bears against the plate for further support of the bracket. Pivotally mounted on the bracket 86, for rotation about an axis parallel to the film advance path 18 (FIG. 1), is a retaining arm 88. A catch 88a on the remote end of the arm positively engages the tab 50e of the shutter-opening blade 50 when the blades are in the cocked position, to retain them there. The catch 88a has a ramp surface 88b which the blade tab 50e cams upward, deflecting the arm upward, when the blades are moved to the cocked position. The arm 88 also has a lifting hook 88c projecting upward from it and by which the arm can be rotated upward (counterclockwise) to lift the catch 88a above and free of the shutter blade tab 50e, thereby releasing the shutter-opening blade to open the camera aperture.

Above the panel portion, the bracket 86 mounts a lever arm 90 that is rotatable about an axis parallel to the rotation axis of the retaining arm 88. A pin 92 engaged in upstanding tabs of the lever arm pivotally mounts the arm, at a location intermediate its ends, to upstanding tabs 86c, 86c on the bracket. One portion 90a of the lever arm extends from the pivotal mounting toward the mounting of the bracket 86 to the support plate, where the end of the lever arm is normally seated under a lip 86d which a further upstanding tab of the bracket forms. A wire spring 94 seated on the pin 92 and compressively engaged between the bracket 86 and the lever arm 90 rotationally biases the arm clockwise about the pin 92 so that the arm bears against the underside of the lip 86d. The other lever arm portion 90b, extending on the other side of its pivotal mounting, extends over the arm 88 to dispose a lateral extension 90c under the lifting hook.

With this construction, downward movement of the lever arm portion 90a adjacent the lip 86d and as indicated with the arrow 94, which is the location where the camera release button 16 (FIG. 1) engages the lever arm 90, rotates the lever arm counterclockwise from the position shown in FIG. 4 to raise the lateral extension 90c by a first distance until it engages the lifting hook 88c. Continued depression of the lever arm portion 90a further raises the lateral extension 90c to raise the lifting hook. This movement rotates the arm 88 counterclockwise to effect the foregoing shutter-releasing movement of catch 88a.

FIG. 4 shows three electrical switches 96, 98 and 100 with which the shutter mechanism 46 preferably operates. The switches are connected with an electronic shutter control circuit module 102 which is further connected with a photocell or similar light detector (not shown) as conventional to provide the following exposure control and photoflash operations. The switches and the circuit module are illustrated as mounted on a circuit board 104 or other suitable support which in turn is mounted within the camera housing.

Stated briefly, when the shutter release button 16 (FIG. 1) is pressed, the resultant initial upward movement of lever arm portion 90b engages switch 96 to signal the module 102 to energize the electromagnet 78. The energized magnet holds the closing blade 52 in place even after it is released from the catch 88a. The upstanding actuator 50b on the opening blade 50 disengages from switch 98, as soon as the blade 50 starts moving to open the camera aperture, to initiate the exposure timing operation of the circuit module 102. The same actuator 50b engages the switch 100, as soon as the blade 50 fully opens the exposure aperture, to signal the module 102 for firing whatever photoflash equipment is connected with the camera.

More particularly, with the illustrated construction, the two contacts of switch 96 are above the lateral extension 90c of the lever arm 90 and are moved by it from a normally open condition to a switch closure condition. This occurs as the arm rotates upon being depressed by the camera release button but prior to the engagement of the lateral extension with the lifting hook 88c and hence prior to the release of the shutter blades from the catch 88a. The contacts of the illustrated switch 98 are biased to be normally open, and are held closed by the actuator 50b when the shutter is cocked. The contacts of switch 100 likewise are normally open and are closed by this actuator 50b as the opening blade 50 fully uncovers the exposure aperture.

The shutter blades 50 and 52 are clocked, i.e., moved to the position shown in FIGS. 3 and 4, by a bracket 106 that is slidingly mounted on the guide rods 64, 66. A tension return spring 108 is connected at one end to the bracket and has the other end connected to the camera frame, illustratively by way of the plate-mounted block 67, to bias the bracket in the same direction as the blades 50 and 52 move during shutter operation, i.e., to the right in FIGS. 3 and 4. The bracket abuts the opposite, i.e., left, side of the stop collars 56 and 58 to limit this biased movement to the position which FIGS. 3 and 4 show. The bracket is thus interposed on the guide rods between the stop collars and the blade tabs 50d and 52b.

A flexible cable 110 fastened to the cocking bracket leads to a cocking drive device 112. This device, which can employ a conventional construction or preferred forms as disclosed in the above-noted application entitled "Film Advance Mechanism", selectively draws the cable 110 and hence the cocking bracket leftward, and then allows the cable to again extend to the position shown, under the action of the return spring 108. The drive device provides this motion after the shutter blades have been released from the position shown and hence are located with the tabs 50d and 52b shifted rightward toward the cocking bracket. Accordingly, the cable-drawn motion of the bracket pushes the tabs 50d and 52b, and hence the shutter blades, back to the cocked position. Upon return of the blades to the cocked position in this manner, the latch 88a securely holds them in that position. The bracket 106 can hence return to its normal position, where it does not interfere with the release motion of the shutter blades.

Figure 5A:
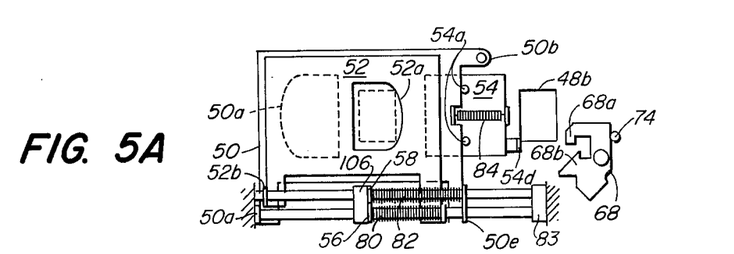
FIG. 5 is a simplified showing of successive stages in the operation of the shutter and viewfinder closure of FIGS. 1 through 4.

The operation and the further construction of the shutter and the viewfinder capping mechanism are shown in the operationally-successive views of FIG. 5, which are now described starting with FIG. 5A. It shows the elements in the cocked position, similar to FIG. 3. In this position, the window 52a in the closing blade 52 is aligned with the image opening 48a and with the taking lens, but no light passes to the image plane because the opaque central section of the opening blade 50 is interposed in the image path. Further, the switch actuator 50b holds the switch 98, which starts the exposure timing, closed. As FIG. 5A also shows, the cocking bracket 106 is in its normal position, disposed against the stop collars 56 and 58, due to the bias of the return spring 108.

With the closing blade 50 retracted, the tension spring 84 pulls the viewfinder blade 54 to its fully-retracted, leftmost, position, where it is entirely out of the viewfinder path so that the viewfinder opening 48b is entirely unobstructed. Accordingly, the camera operator can view the subject to be photographed through the viewfinder. It is noteworth that in this position the stops 54a, 54a are in contiguous abutment against the edge of the opening blade 50, by virtue of the spring 84, to limit the leftmost travel of the capping blade 54. Further, the spring 84 is preferably only slightly tensioned, i.e., not lax but not taut. The shutter driving springs 80 and 82, on the other hand, are fully compressed and ready to drive the shutter blades to their fully extended, i.e., rightmost, positions.

Figure 5B:
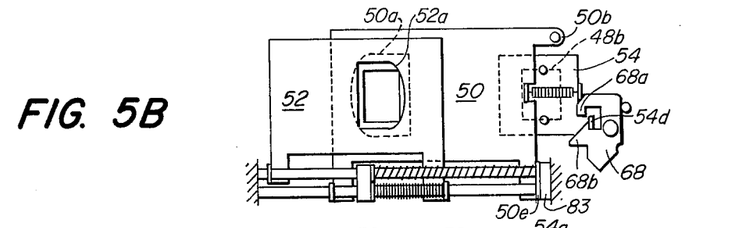

When the camera operator depresses the release button 16 sufficiently to close the switch 96 by way of the lever arm 90, to energize the blade-retaining electromagnet 78, and then further to lift the catch 88 from engagement with the shutter tab 50e, the spring 82 drives the opening blade 50 to the right to the position shown in FIG. 5B. The window of this plate is now aligned with the other openings, and accordingly the camera shutter is open for exposing the film unit located at the image plane. Movement of the actuator 50b has opened the switch 98 to start exposure timing, and has closed the switch 100 to actuate the flash-firing circuit.

The circuit module 102 continues to energize the electromagnet 78 and thereby holds the closing blade in its retracted position.

In undergoing the foregoing motion, the shutter-opening blade 50 is driven by the spring 82 with a force aligned exactly with the direction of blade movement and essentially coincident with the slide rod which guides the blade movement. This in-line and coincident arrangement of the blade-driving force with the blade motion and the blade guide is deemed of significant advantage for achieving rapid blade movement with minimal friction and minimal likelihood of blade jamming. Further, it requires minimal blade-driving force because all the force is directed to move the blade, and essentially none is directed elsewhere; the driving force on the blade hence does not tend to physically distort the shutter elements and develops minimal drag.

The movement of the opening plate 50 from the retracted position of FIG. 5A to the extended position of FIG. 5B drivingly carries the viewfinder capping blade 54 with it—by abutment of the blade 50 against the stops 54a, 54a—so that this blade closes the viewfinder path coincident with the opening of the camera shutter.

Further, as FIG. 5B shows, the latch bar 54d on the viewfinder capping blade is seatingly engaged by the latch 68 behind both latch fingers. This occurs because the movement of the capping blade carries the latch bar into engagement with the camming surface of the latch finger 68b, and thereby rotates the latch counterclockwise. As the latch rotates, the latch bar passes the finger 68a and engages behind the finger 68b. The catch is now free to rotate, due to the restoring action of the spring 72, back to its normal position where it abuts the stop 74.

It is further noteworthy that in the position of FIG. 5B, although the latch finger 68b is in positive engagement with the latch bar and hence prevents it from being drawn out of the latch, the latch bar is subjected to forces which bias it back to the left, i.e., out of the latch. The illustrated construction preferably provides this resilient bias with two separate force-producing elements, namely the resilient cushion 83, and the tension spring 84, although either one of these elements alone can be sufficient. The cushion 83 provides a restoring force because driving engagement of the opening blade tab 50e against the cushion initially overcompresses it, which allows the blade to overshoot by a slight but significant distance from the stable position shown in FIG. 5B. The resilient cushion recovers essentially instantaneously and presses the blade back by the small amount of overshoot, which typically is only a few millimeters. This slight overshoot travel of the opening blade causes a similar overshoot travel of the capping blade, but engagement of that latter blade within the latch prevents it from moving back with the opening blade. Hence, the resilient cushion 83, in moving the opening blade 50 back from its overshoot position, produces a slight but significant increase in the tension of spring 84.

The spring 84 is also additionally tensioned because when the opening blade is brought to a stop by the cushion, the capping blade 54 continues moving rightward, into engagement with the latch, due to inertia. Thus, in addition to moving beyond the rest position of the opening blade 50 due to overcompression of the resilient cushion, the capping blade moves further beyond the opening blade by virtue of the inertial movement of the capping blade after the opening blade has come to a stop. Thus, the final movement of the capping blade—which carries the latch bar into the latch—is due to this overcompression of the resilient cushion and to the inertial movement of the capping blade. Since the opening blade, when at rest against the cushion, has not undergone either of these motions and hence comes to rest offset to the left from the rest position, which the latch imposes on the capping blade, the spring 84 is tensioned by a slight but significant factor more when in the position of FIG. 5B than when in the position of FIG. 5A. The operation which results from this increased tension in spring 84 will be described hereinafter.

Figure 5C:
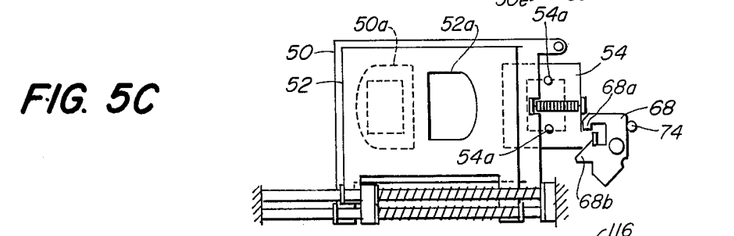

With reference now to FIG. 5C, when the circuit module 102 de-energizes the electromagnet 78 to release the aperture-closing blade 52, i.e., to stop the film exposure period, the compressed spring 80 drives the closing blade from its retracted position of FIGS. 5A and B to its extended position of FIG. 5C. As FIG. 5C shows, this movement carries the window 52a of the closing blade out of alignment from the image path and interposes an opaque portion of the blade across the image path to block light from passing along it from the camera lens 30. The blade movement again is guided by guide rods 64, 66 and is driven by a spring force aligned with the motion and concentric with one of the rods. The opening blade and capping blade remain undisturbed during this exposure-terminating movement of the blade 52.

Typically the camera operation continues with advance of the exposed film unit from the camera image surface and along the film path 18 (FIG. 1) toward the processing rollers 20, 22. Both the camera shutter and the viewfinder are closed, the former by an opaque portion of the closing blade 52 and the latter by the viewfinder capping blade 54. Accordingly, as the photosensitive surface of the film unit passes beneath these elements, no light from the image path or the viewfinder path reaches the photosensitive film surface. The latent image impressed on the film unit at the image surface hence remains intact as the film unit reaches the processing rollers, which initiate fixation of the latent image.

Figure 5D:
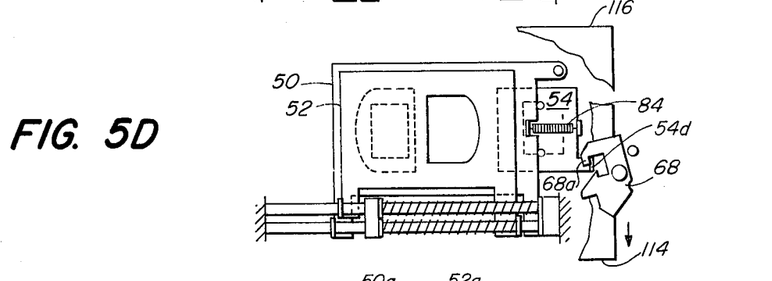

However, passage of the film unit by the latch camming shelf 68c (FIG. 2) initiates an escapement movement of the latch which allows the capping blade to be retracted after the film has completely passed. More particularly, as shown in FIG. 5D, as the exposed film unit is advanced past the latch, its leading edge 114 interferingly engages the latch camming shelf 68c and cams it aside, which rotates the latch counterclockwise, against the restoring force of the spring 72. FIG. 5D shows the latch rotated in this manner (the amount of rotation is exaggerated somewhat for clarity of illustration). This rotation of the latch by the passing film unit draws the latch finger 68b away from the latch bar on the viewfinder capping blade, but interposes the other finger 68a in the path of the bar, which is biased by the tension of spring 84 to move out of the latch. Because the latter finger is forward of the prior finger, as noted above, the latch bar moves forward of the retaining edge of the latch finger 68b and hence is released from it, as FIG. 5D shows. The latch remains in the rotational position shown in FIG. 5D, due to continued engagement of the lateral margin of the film unit with the camming shelf 68c, throughout passage of the film unit by the latch. Hence, the latch finger 68a continues to hold the viewfinder capping blade closed.

Figures 5E, 5F:
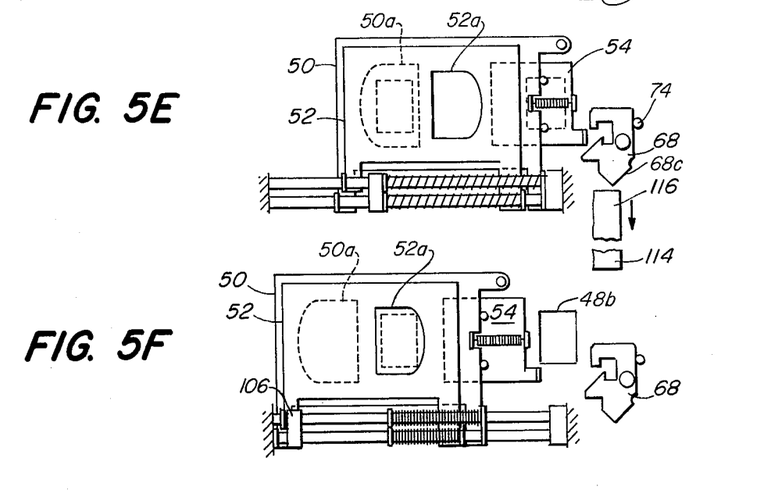

However, when the film unit trailing edge 116 passes the camming shelf 68c of the latch, FIG. 5E, the latch rotates back to its normal position. This rotation releases the latch bar 54d from behind the latch finger 68a. The latch bar is now entirely free of the latch 68.

The shutter blades and capping blade remain as shown in FIG. 5E, where the closing blade 52 blocks the shutter opening and the capping blade blocks the viewfinder but is released from the latch 68, until the camera is recocked. This is effected by moving the recocking bracket 106 from the normal position in FIGS. 5A through 5E leftward to the position in FIG. 5F. This motion, imparted to the bracket from the cocking drive device (which can be manual or motor-driven) via the cable 110, returns the blades 50 and 52 to their retracted cocked position, FIG. 5F. The catch 88a again positively engages the blade tab 50e to hold both blades in the cocked position. Release of the cocking force from the cable 110 allows the cocking bracket to return to the normal position of FIGS. 5A through E, due to the restoring action of the spring 108.

With further reference to FIG. 5, in the event that the camera is recocked immediately after the shutter closes and prior to the passage of the exposed film unit along the film advance path 18, the capping blade 54 will nevertheless remain interposed across the viewfinder until the film unit has been advanced past the viewfinder path. The capping blade stays in the position shown in FIG. 5C when the blades are recocked to the position shown in FIG. 5F by virtue of the latch 68. The tension spring 84 interconnecting the capping blade with the opening blade, extends as the shutter blades are drawn back to the recocked position. Thereafter, when the film unit is advanced across the viewfinder path, its passage selectively rotates the latch 68 in the same manner described above to release the capping blade upon the completion of film passage. The extended spring 84 then snaps the capping blade back to the retracted position of FIGS. 5A and 5F.

It will thus be seen that the objects set forth above, among those made apparent from the preceding description, are efficiently attained. Since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A photographic camera employing separate film units and having a viewfinder apparatus and a means for advancing a photosensitive film unit along a given film path which crosses the optical viewfinder path, said viewfinder apparatus comprising:
    means for defining said viewfinder path;
    a viewfinder capping member;
    means for mounting said capping member for movement between a first position wherein said capping member is in unblocking relation to said viewfinder path to permit scene viewing and a second position wherein said capping member blocks said viewfinder path from passing light to an advancing film unit;
    actuatable means for transferring said capping member between its said first and second positions; and
    means for retaining said capping member in its said second position irrespective of operation of said transferring means.

2. The apparatus of claim 1 wherein said retaining means includes means responsive to substantially complete advancement of a film unit across said viewfinder path for releasing said capping member for return to its said first position.

3. The apparatus of claim 1 wherein said retaining means includes means responsive to transfer of said capping member to its said second position for retaining said capping member in its said second position and, in response to substantially complete advancement of said film unit across said viewfinder path, for releasing said capping member for return to its said first position.

4. The apparatus of claim 1 in which said retaining means comprises:
    means for sensing the passage of a film unit into and out of the viewfinder path; and
    escapement means for effecting release of said retaining means in successive stages, a first of which is responsive to the passage of a given film unit into said viewfinder path and a second of which is responsive to the passage of said given film unit out of said viewfinder path.

5. The apparatus of claim 1 in which said retaining means includes a latch member having a first latch element for retaining said capping member in said second position and for releasing said capping member responsive to passage of a given film unit into said viewfinder path, and a second latch element for retaining said capping member in said second position subsequent to said release by said first latch element and for releasing said capping member responsive to passage of said given film unit out of said viewfinder path.

6. The apparatus of claim 1 wherein said camera includes a shutter mechanism actuatable between a light blocking position and a film exposure position, and said transferring means includes means for displacing said capping member to its said second position responsive to actuation of said shutter mechanism to its said film exposure position.

7. The apparatus of claim 6 wherein said shutter mechanism includes a blade member displaceable in a given direction from a first position wherein it is in blocking relation to the exposure path of said camera and a second position wherein it is in unblocking relation thereto, and said transferring means includes means for biasing said capping member into abutting engagement with a leading portion of said blade member so that said capping member is carried from its said first to its said second position by displacement of said blade member to its said unblocking position.

8. The apparatus of claim 7 wherein said biasing means also functions to return said capping member to its said first position upon both release by said retaining means and displacement of said blade member to its blocking position.

9. The apparatus of claim 8 in which said blade member is mounted for sliding movement in a first direction from its said first position to its second position, and said capping member is arranged for sliding movement in said first direction between its said first and second position, and said transferring means includes means resiliently urging said capping member into abutting engagement with said blade member for simultaneously moving said capping member from its said first position to its said second position during movement of said blade member from its said first position to its said second position.

10. The apparatus of claim 8 wherein said restraining means includes a latch member responsive to engagement by said capping member for retaining said capping member in said first position.

* * * * *